United States Patent
Choi et al.

(10) Patent No.: US 9,954,943 B2
(45) Date of Patent: Apr. 24, 2018

(54) METHOD FOR CONFIGURING MULTI-VISION AND ELECTRONIC DEVICE THEREFOR

(71) Applicant: Samsung Electronics Co., Ltd., Suwon-si, Gyeonggi-do (KR)

(72) Inventors: Gyu-Cheol Choi, Gumi-si (KR); Hyung-Jin Kim, Daegu (KR); Jung-Il Cho, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 392 days.

(21) Appl. No.: 14/694,100

(22) Filed: Apr. 23, 2015

(65) Prior Publication Data

US 2015/0309684 A1    Oct. 29, 2015

(30) Foreign Application Priority Data

Apr. 25, 2014 (KR) .................. 10-2014-0050267

(51) Int. Cl.
*H04L 29/08* (2006.01)
*G06F 3/14* (2006.01)

(52) U.S. Cl.
CPC ........ *H04L 67/1042* (2013.01); *G06F 3/1446* (2013.01); *G09G 2354/00* (2013.01); *G09G 2356/00* (2013.01); *G09G 2370/16* (2013.01)

(58) Field of Classification Search
CPC ............. H04L 67/1042; G06F 3/1446; G09G 2354/00; G09G 2356/00; G09G 2370/16
USPC ..................................... 345/2.1–2.3
See application file for complete search history.

(56) References Cited

U.S. PATENT DOCUMENTS

| | | | |
|---|---|---|---|
| 9,692,869 B2 * | 6/2017 | Gai ..................... | H04M 1/7253 |
| 2011/0231783 A1 * | 9/2011 | Nomura ................ | G06F 3/0488 |
| | | | 715/761 |
| 2012/0139939 A1 | 6/2012 | Russ et al. | |
| 2012/0242596 A1 * | 9/2012 | Sip ...................... | G06F 3/04883 |
| | | | 345/173 |
| 2014/0313103 A1 * | 10/2014 | Goel ...................... | H04L 67/10 |
| | | | 345/2.2 |

* cited by examiner

*Primary Examiner* — Kumar Patel
*Assistant Examiner* — Amy C Onyekaba
(74) *Attorney, Agent, or Firm* — Jefferson IP Law, LLP

(57) ABSTRACT

A method for configuring multi-vision by an electronic device is provided. The method includes obtaining, by the electronic device, a user input, generating first user input information from the obtained user input, determining whether the electronic device is one of a master device and a slave device, when the electronic device is determined to be the master device, obtaining second user input information from one or more other electronic devices, and determining an arrangement structure of one of the master device and the slave device based on one of the first user input information and the second user input information.

21 Claims, 17 Drawing Sheets

| SCREEN | INPUT TERMINATING TIME | EDGE DIRECTION |
|---|---|---|
| FIRST SCREEN (810) | $t_2$ | right |
| SECOND SCREEN (820) | $t_4$ | right |
| THIRD SCREEN (830) | $t_6$ | mid |

| SCREEN | INPUT TERMINATING TIME | EDGE DIRECTION |
|---|---|---|
| FIRST SCREEN (910) | $t_1$ | right |
| SECOND SCREEN (920) | $t_2$ | bottom |
| THIRD SCREEN (930) | $t_3$ | mid |
| FOURTH SCREEN (940) | $t_4$ | mid |

| SCREEN | INPUT TERMINATING TIME | EDGE DIRECTION |
|---|---|---|
| FIRST SCREEN (1010) | $t_1$ | bottom |
| SECOND SCREEN (1020) | $t_2$ | left |
| THIRD SCREEN (1030) | $t_3$ | left |
| FOURTH SCREEN (1040) | $t_4$ | top |
| FIRST SCREEN (1010) | $t_5$ | mid |

| SCREEN | INPUT TERMINATING TIME | EDGE DIRECTION |
|---|---|---|
| FIRST SCREEN (1110) | $t_1$ | right |
| SECOND SCREEN (1120) | $t_2$ | right |
| THIRD SCREEN (1130) | $t_3$ | right |
| FOURTH SCREEN (1140) | $t_4$ | right |
| FIFTH SCREEN (1150) | $t_5$ | right |
| FIRST SCREEN (1110) | $t_6$ | mid |

| | Col 1 | Col 2 | Col 3 | Col 4 |
|---|---|---|---|---|
| Row 1 | top | bottom | left | right |
| Row 2 | bottom | top | right | left |
| Row 3 | left | right | bottom | top |
| Row 4 | right | left | top | bottom |

| SCREEN | INPUT TERMINATING TIME | EDGE DIRECTION OF INPUT STARTING POINT | EDGE DIRECTION OF INPUT TERMINATING POINT |
|---|---|---|---|
| FIRST SCREEN (1310) | $t_1$ | mid | right |
| SECOND SCREEN (1320) | $t_2$ | left | right |
| THIRD SCREEN (1330) | $t_3$ | left | mid |

METHOD FOR CONFIGURING MULTI-VISION AND ELECTRONIC DEVICE THEREFOR

CROSS-REFERENCE TO RELATED APPLICATION(S)

This application claims the benefit under 35 U.S.C. § 119(a) of a Korean patent application filed on Apr. 25, 2014 in the Korean Intellectual Property Office and assigned Serial number 10-2014-0050267, the entire disclosure of which is hereby incorporated by reference.

TECHNICAL FIELD

The present disclosure relates to a method for configuring a multi-vision and an electronic device for the same.

BACKGROUND

Typically, a multi-vision function, by which a screen larger than a single display can be formed by using a plurality of displays to thereby display an expanded image, has been implemented through a dual monitor system for Personal Computers (PCs) or multi-vision image systems.

FIG. 1A illustrates an image for configuring dual monitors in a dual monitor system according to prior art, and FIG. 1B illustrates a plurality of display devices in a multi-vision image system according to prior art. In a case of the dual monitor system for a PC and the multi-vision image system, since fixed screens are used, the location and resolution of each screen may be configured by utilizing a function of configuration of a display master (controllers of a PC or a multi-vision) during initial installation.

However, in a case of portable electronic devices, unlike the dual monitor system of the PC or the multi-vision image system, the location and configuration of the screen may frequently vary. Accordingly, the portable electronic devices require a different method from the dual monitor system or the multi-vision image system.

According to an example of applying the multi-vision function to portable electronic devices, a user may connect each electronic device constituting the multi-vision with a screen master via a wire or wirelessly, and then the relative location and resolution of each electronic device may be configured by the screen master.

According to another example of applying the multi-vision function to portable electronic devices, sensors (e.g., a Hall Integrated Circuit (IC), a magnetic generator, or the like) which can detect the relative location of each electronic device may be disposed in each electronic device. At this time, each electronic device may recognize the relative location of each electronic device by using signals detected by each electronic device.

According to another example of applying the multi-vision function to portable electronic devices, the electronic devices may be disposed by considering differences of images obtained by cameras provided on one side of each electronic device.

FIGS. 2A to 2C illustrate other examples of generally applying the multi-vision function to portable electronic devices. A user may designate the sequence of electronic devices through a User Interface (UI) displayed on each screen of the electronic devices. After designating the sequence of the electronic devices, the user may dispose the electronic devices so that reference lines displayed on each screen of the electronic devices are aligned with each other.

FIGS. 2A and 2B show that the user determines the sequence of a plurality of electronic devices 201, 202, 203, 204 and 205, and FIG. 2C shows that the user makes reference lines 250 displayed on each screen of the electronic devices 201, 202, 203, 204 and 205 and aligns the screen accordingly.

One of the methods for applying the multi-vision function to electronic devices is a multi-device link by which a plurality of electronic devices or apparatuses may interwork with each other regardless of the environment of screens. For example, the multi-device link may be used to designate the locations of speakers for configuring multi-channels in an audio system, or to operate the multi-vision.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and a method for providing multi-vision for portable electronic devices.

However, in order to apply a multi-vision device link to the portable electronic devices, the user should manually conduct all operations of connecting and disposing the electronic devices. In addition, in using sensors, every single electronic device should adopt a sensor for applying the multi-device link to the portable electronic devices. Further, the method of using front cameras is preferable for easy configuration by the user. However, the differences between images photographed by the front cameras of small electronic devices are not large enough to obtain the proper accuracy. Furthermore, the method of using color information and reference lines as shown in FIGS. 2A to 2C is not flexible in disposing the electronic devices because the reference lines should be accurately aligned with each other.

Another aspect of the present disclosure is to provide a method and an electronic device by which a user can easily configure multi-vision having various structures by using one or more electronic devices of various sizes or forms.

In accordance of an aspect of the present disclosure, a method for configuring multi-vision by an electronic device is provided. The method includes obtaining, by the electronic device, a user input, generating first user input information from the obtained user input, determining whether the electronic device is one of a master device and a slave device, when the electronic device is determined to be the master device, obtaining second user input information from one or more other electronic devices, and determining an arrangement structure of one of the electronic device and the one or more other electronic devices based on one of the first user input information and the second user input information.

In accordance of another aspect of the present disclosure, an electronic device for configuring multi-vision is provided. The electronic device includes a screen configured to obtain a user input, a communication interface configured to communicate with one or more other electronic devices, and a controller configured to generate first user input information based on the user input obtained through the screen, determine whether the electronic device is one of a master device and a slave device, control the communication interface to obtain second user input information from the one or more other electronic devices when the electronic device is determined to be the master device, and determine an arrangement structure of one of the electronic device and the one or more other electronic devices based on one of the first user input information and the second user input information.

According to various embodiments of the present disclosure, a method which enables a user to easily configure a multi-vision by using various kinds of electronic devices is provided.

In addition, according to various embodiments of the present disclosure, a method and an electronic device which enable the user to easily configure a multi-vision having various structures by using one or more electronic devices of various sizes or forms is provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIGS. 3 through 12C, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

Figure 1A:
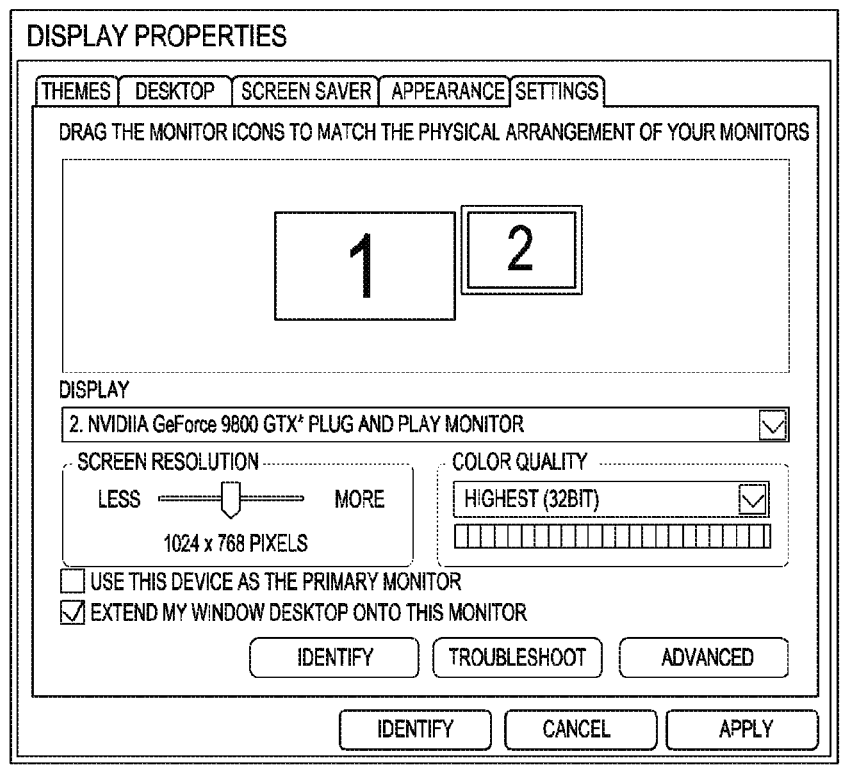
FIG. 1A illustrates an image for configuring dual monitors in a dual monitor system according to prior art.
Figure 1B:
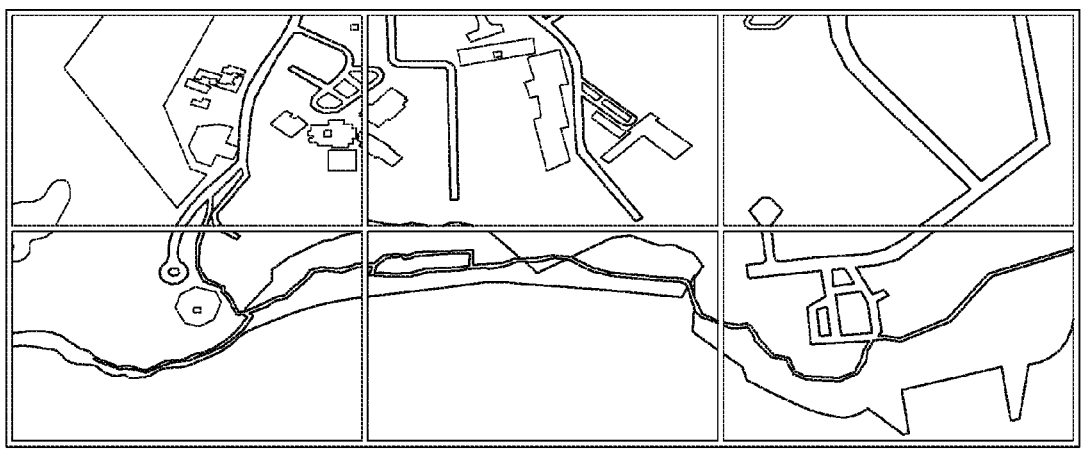
FIG. 1B illustrates a plurality of display devices in a multi-vision image system according to prior art.
Figure 2A:
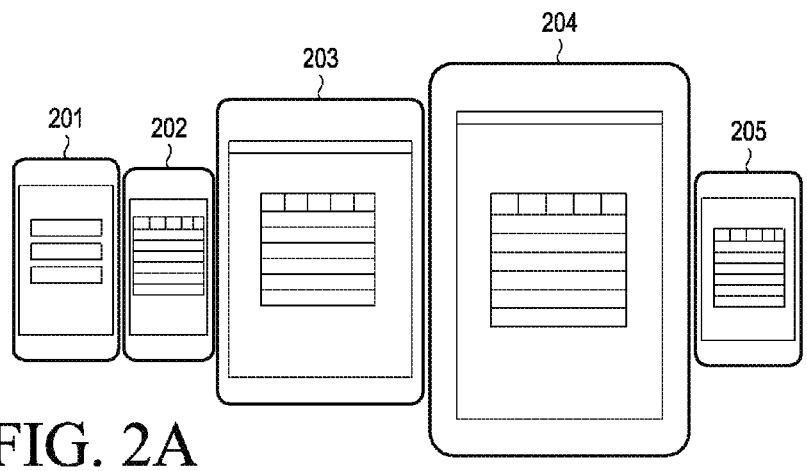
FIGS. 2A, 2B, and 2C illustrate other examples of applying a multi-vision function to portable electronic devices according to prior art.
Figure 2B:
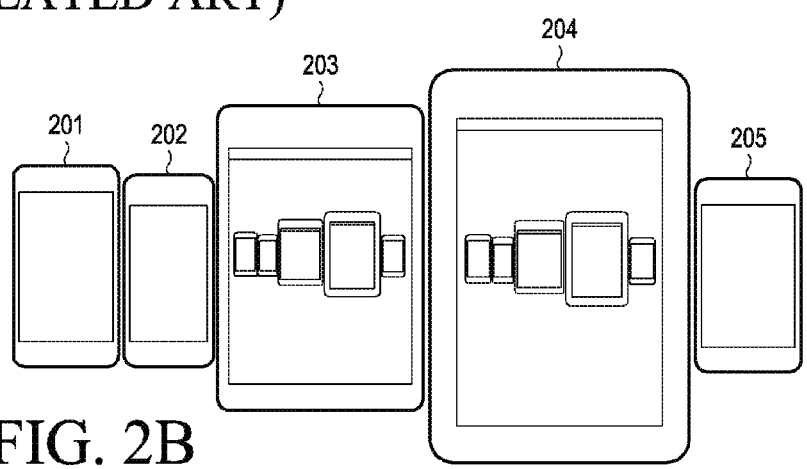
Figure 2C:
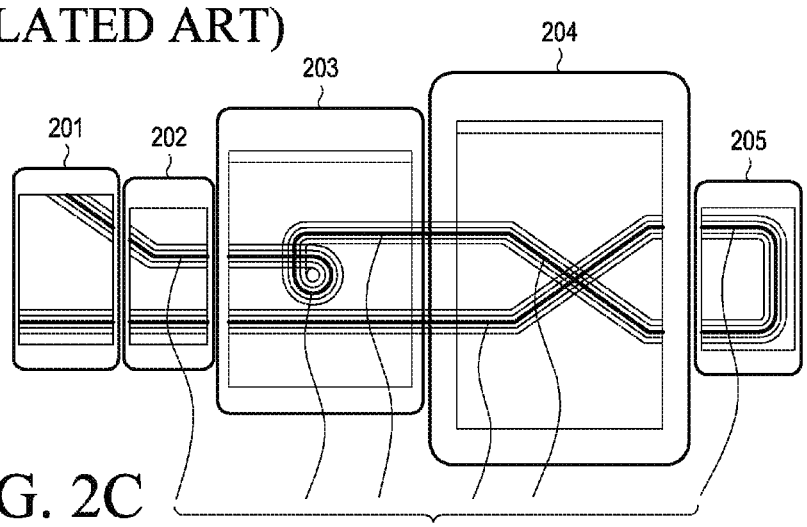
Figure 3:
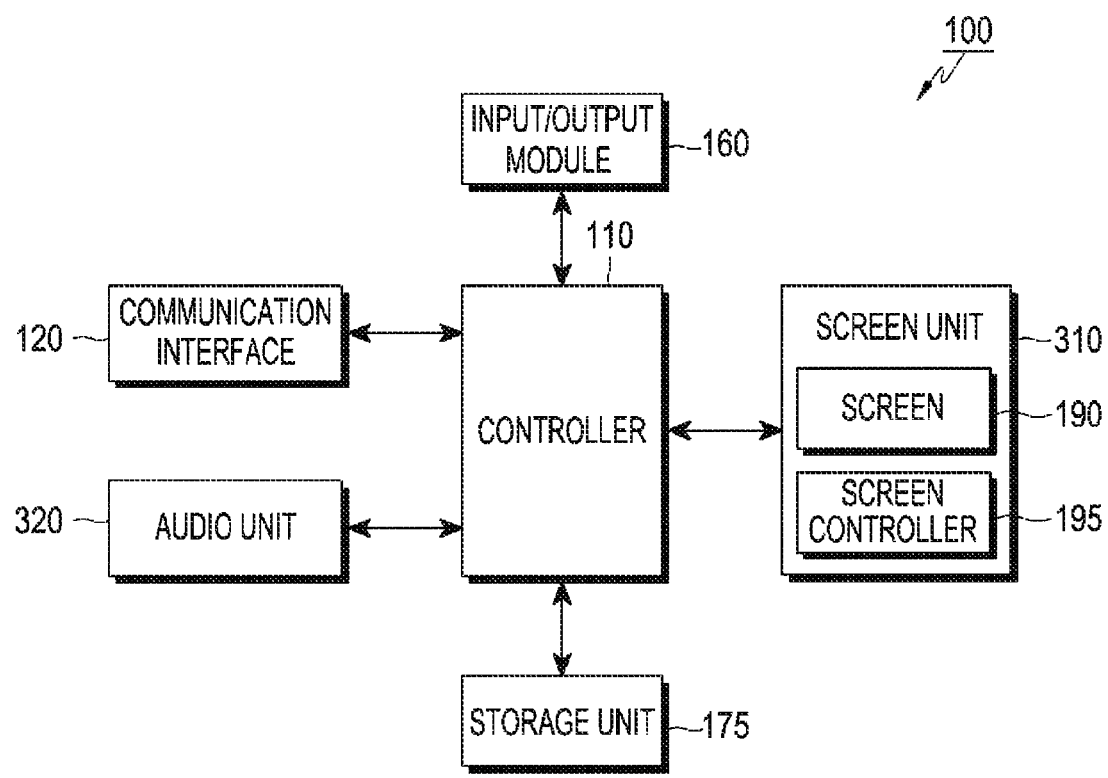
FIG. 3 is a block diagram illustrating a configuration of an electronic device according to an embodiment of the present disclosure.

FIG. 3 is a block diagram illustrating a configuration of an electronic device according to an embodiment of the present disclosure.

Referring to FIG. 3, an electronic device 100 according to an embodiment of the present disclosure is illustrated, the electronic device 100 may include a communication interface 120, a screen unit 310, a storage unit 175, an input/output module 160, and a controller 110. According to the present embodiment, the electronic device 100 may further include an audio unit 320.

The controller 110 may control overall operations of the electronic device 100. According to various embodiments of the present disclosure, the controller 110 may include a Computer Processing Unit (CPU), a Read-Only Memory (ROM) that stores control programs for controlling the electronic device 100, and a Random Access Memory (RAM) that stores signals or data input from outside of the electronic device 100 or that is used as a memory area for operations performed in the electronic device 100. The CPU may include a single core, dual cores, triple cores, or quad cores. The CPU, the ROM and the RAM may be connected with each other through an internal bus.

The controller 110 may control the communication interface 120, the screen unit 310, the storage unit 175, and the audio unit 320. The controller 110 may control various content displayed on a screen 190 or a display of the content by controlling the screen 190 of the screen unit 310. The controller 110 may control the electronic device 100 to perform operations according to a touch input, i.e., a user input detected through the screen 190. When the touch input is received by touching at least one point on the screen 190, the controller 110 may control the electronic device 100 to perform an operation corresponding to the touch input.

According to various embodiments of the present disclosure, when the user input is detected through the screen unit 310, the controller 110 may generate user input information on the user input. The user input information may include a point (an input starting point) where the user input starts, a point (an input terminating point) where the user input terminates, a time (an input starting time) when the user input starts, and a time (an input terminating time) when the user input terminates. The user input information may further include resolution information of the electronic device 100.

The controller 110 according to an embodiment of the present disclosure may determine whether the input starting point, where the user input starts, is in a non-edge area of the screen 190. If the input starting point is in the non-edge area, the controller 110 may determine that the electronic device 100 itself is the master device. If the input starting point is not in the non-edge area, i.e., if the input starting point is on the edge, the controller 110 may determine that the electronic device 100 itself is a slave device.

The controller 110 according to another embodiment of the present disclosure may determine whether the input terminating point, where the user input terminates, is in the non-edge area on the screen 190. If the input terminating point is in the non-edge area, the controller 110 may determine that the electronic device itself is a master device. In addition, if the input terminating point is on the edge, the controller 110 may determine that the electronic device 100 itself is a slave device.

As described above, the electronic device 100 according to according to various embodiments of the present disclosure may be a master device or a slave device. The master device may collect user input information from each slave device, and recognize the arrangement structure of the master device and the slave devices, i.e., a multi-vision structure, based on the user input information. The slave device may transmit the user input information to the master device in response to the request of the master device, and operate according to the control of the master device. According to the embodiment, the slave device may broadcast its own user input information to allow the master device to collect the user input information of the slave device.

When the electronic device 100 is determined to be the master device, the controller 110 of the electronic device 100 may control the communication interface 120 to collect the user input information that is broadcast or received from each slave device.

When the user input information is received from each slave device, the controller 110 of the master device may determine an arrangement structure of the electronic devices 100, i.e., a multi-vision structure, based on the user input information of the master device and the user input information received from the slave devices. When the multi-vision structure is determined, the controller 110 may configure the multi-vision according to the arrangement structure. For example, the controller 110 may allot data (e.g., multimedia data) that is to be received by each slave device.

When the electronic device 100 is determined to be the master device, the controller 110 according to an embodiment of the present disclosure may generate a notification message stating that the electronic device 100 is the master device. With the generation of the notification message, the controller 110 may control the communication interface 120 to broadcast the notification message. At this time, the notification message may include a message that requests each slave device to transmit the user input information of each slave device.

According to the embodiment, when the electronic device 100 is determined to be the slave device, the controller 110 may control the communication interface 120 to broadcast the user input information of the electronic device 100 to be received by the master device.

The communication interface 120 may perform wireless or wired communication of the electronic device 100. The communication interface 100 according to various embodiments of the present disclosure may broadcast or transmit the user input information to the master device under the control of the controller 110.

The audio unit 320 may output sounds corresponding to various signals (e.g., wireless signals, broadcasting signals, digital audio files, digital movie files, photographing, or the like) of the electronic device 100 to the outside of the electronic device 100 under the control of the controller 110. Particularly, a speaker (not shown) included in the audio unit 320 may output sounds (e.g., a button sound or a ring back tone corresponding to a phone call function) corresponding to functions performed by the electronic device 100. One or more speakers may be provided at a proper position(s) on the housing of the electronic device 100.

The storage unit 175 may store various data for controlling operations of the electronic device 100. The storage unit 175 may store the user input information and the resolution information of the electronic device 100. The multi-vision of the master device and the slave devices may be configured, the storage unit 175 may store data (e.g., multimedia data) to be output through the screen 190 of the electronic device 100.

The storage unit 175 may include a ROM and a RAM in the controller 110, or memory cards (e.g., SD cards, memory sticks, or the like) installed in the electronic device 100. The storage unit 175 may include non-volatile memories, volatile memories, Hard Disc Drives (HDDs), or Solid State Drives (SSDs).

The screen unit 310 may include the screen 190 and a screen controller 195.

The screen 190 may display various data stored to control the electronic device 100. According to the embodiment, the screen 190 may be implemented in the form of a touch screen that receives user inputs (a touch input, a drag input, or the like) generated by touching the screen 190 with input means (e.g., fingers or styluses). In addition, the screen 190 may provide user interfaces corresponding to various services (e.g., a phone call, data transmission, broadcasting, photographing, or the like) to the user. The screen 190 may transmit analog signals (touch inputs) corresponding to at least one touch of the user interfaces to the screen controller 195. The screen 190 may receive at least one touch input by a user's body (e.g., fingers including the thumb) or a touchable input means (e.g., stylus pens). Also, the screen 190 may receive a continuous movement touch among the at least one touch. The screen 190 may transmit analog signals corresponding to the continuous movement touch to the screen controller 195.

According to various embodiments of the present disclosure, touches are not limited to contacts with a user's body or a touchable input means, and may further include non-touching gestures. That is, the screen 190 may detect a user input which does not touch the screen 190. In the non-touching type according to various embodiments of the present disclosure, the interval between the screen 190 and the input means may be changed depending on the performance and the structure of the electronic device 100. For example, the interval between the screen 190 and the user's body or the touchable input means may be equal to or less than 3 cm, or may be equal to or more than 3 cm according to another embodiment of the present disclosure. According to the embodiment of the present disclosure, the screen 190 may be implemented by, for example, a resistive type, a capacitive type, an infrared type, or an acoustic wave type.

The screen controller 195 may transform analog signals received from the screen 190 to digital signals (e.g., coordinates X and Y) and transmit the same to the controller 110. The controller 110 may control the screen 190 by using the digital signals received from the screen controller 195. According to the embodiment, the screen controller 195 may be implemented to be included in the controller 110.

The screen controller 195 according to various embodiments of the present disclosure may extract coordinates of the input starting point, where the user input starts, and coordinates of the input terminating point, where the user input terminates on the screen 190, and transfer the same to the controller 110.

Figure 4A:
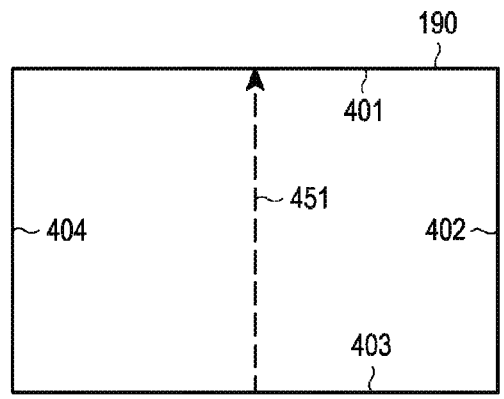
FIGS. 4A, 4B, and 4C illustrate examples of user inputs through an electronic device according to various embodiments of the present disclosure.
Figure 4B:
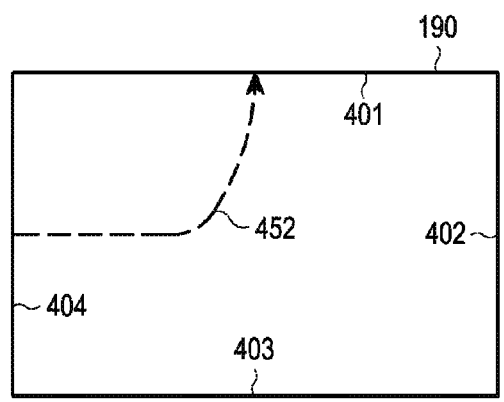
Figure 4C:
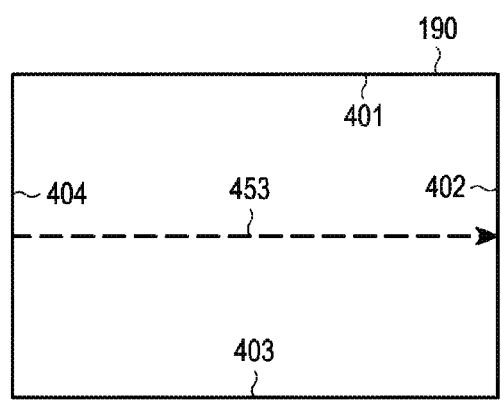

FIGS. 4A to 4C illustrate an example of user inputs through an electronic device according to various embodiments of the present disclosure.

Referring to FIGS. 4A to 4C, a screen 190 is illustrated, where the screen 190 may include a first edge 401, a second edge 402, a third edge 403, and a fourth edge 404. According to an embodiment of the present disclosure, the various edges refer to ends of the screen 190, and it may be sides of the screen 190 in a form of a rectangle as shown in FIGS. 4A to 4C. In addition, the remaining area except for the edges (e.g., sides of the rectangle) of the screen 190 may be a non-edge area.

User inputs 451, 452 and 453 shown in FIGS. 4A to 4C are edge-to-edge inputs which start on an edge and are then dragged to another edge to terminate thereon.

For example, the user input 451 of FIG. 4A is an edge-to-edge input that is dragged from the third edge 403 to the first edge 401. The user input 452 of FIG. 4B is an edge-to-edge input that is dragged from the fourth edge 404 to the first edge 401. The user input 453 of FIG. 4C is an edge-to-edge input that is dragged from the fourth edge 404 to the second edge 402.

Figure 5A:
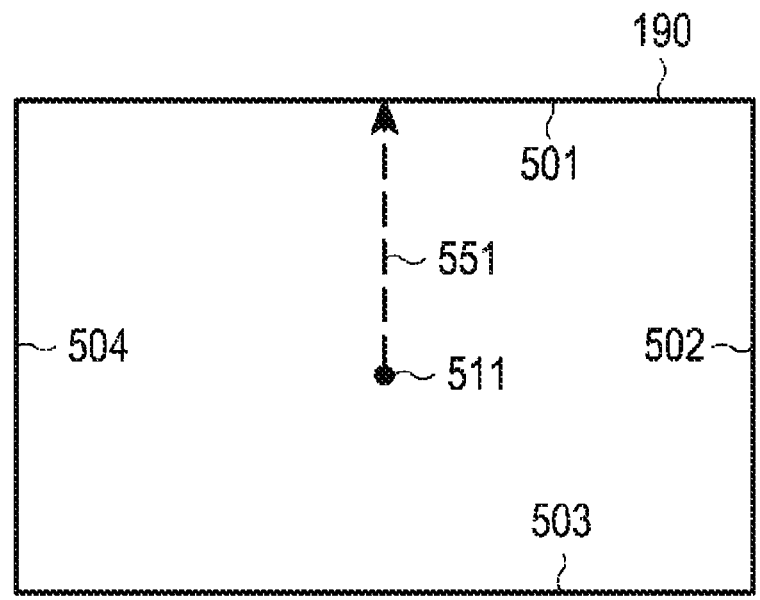
FIGS. 5A and 5B illustrate other examples of user inputs through an electronic device according to various embodiments of the present disclosure.
Figure 5B:

FIGS. 5A and 5B illustrate other examples of user inputs through an electronic device according to various embodiments of the present disclosure.

Referring to FIGS. 5A and 5B, a screen 190 is illustrated, where the screen 190 may include a first edge 501, a second edge 502, a third edge 503, and a fourth edge 504. User inputs 551 and 552 shown in FIGS. 5A and 5B are non-edge-to-edge inputs which start in a non-edge area and are then dragged to one of the four edges 501, 502, 503 and 504 to terminate thereon.

The user input 551 in FIG. 5A is the non-edge-to-edge input which starts at a certain point 511 on the screen 190 and is then dragged to the first edge 501 to terminate thereon. The user input 552 in FIG. 5B is the non-edge-to-edge input which starts at a certain point 512 on the screen 190 and is then dragged to the second edge 502 to terminate thereon.

Figure 6A:
FIGS. 6A and 6B illustrate other examples of user inputs through an electronic device according to various embodiments of the present disclosure.
Figure 6B:
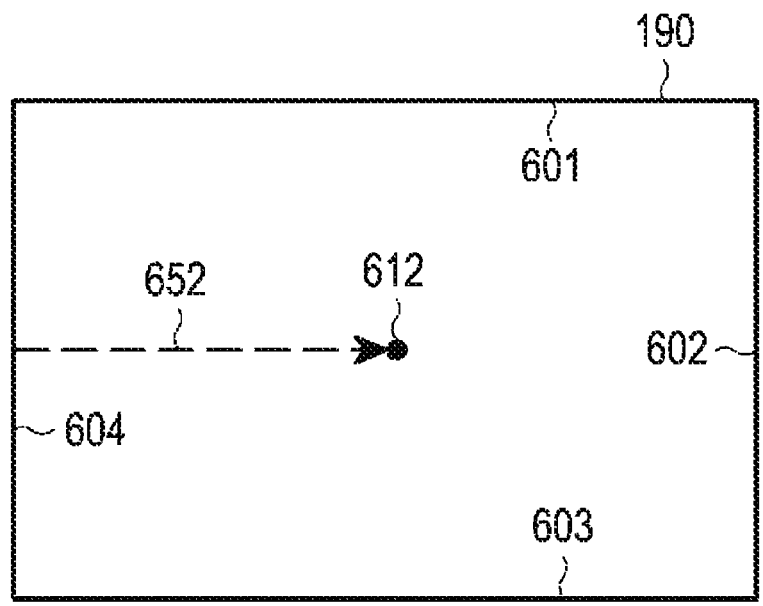

FIGS. 6A and 6B illustrate other examples of user inputs through an electronic device according to various embodiments of the present disclosure.

Referring to FIGS. 6A and 6B, a screen 190 is illustrated, where the screen 190 may include a first edge 601, a second edge 602, a third edge 603, and a fourth edge 604. User inputs 651 and 652 shown in FIGS. 6A and 6B are edge-to-non-edge inputs which start on one of the edges and are then dragged to certain points 611 and 612 on the screen 190 to terminate thereon.

The user input 651 in FIG. 6A is the edge-to-non-edge input which starts on the third edge 603 and is then dragged to a certain point 611 on the screen 190. The user input 652 in FIG. 6B is the edge-to-non-edge input which starts on the fourth edge 604 and is then dragged to a certain point 612 on the screen 190 to terminate thereon.

Figure 7A:
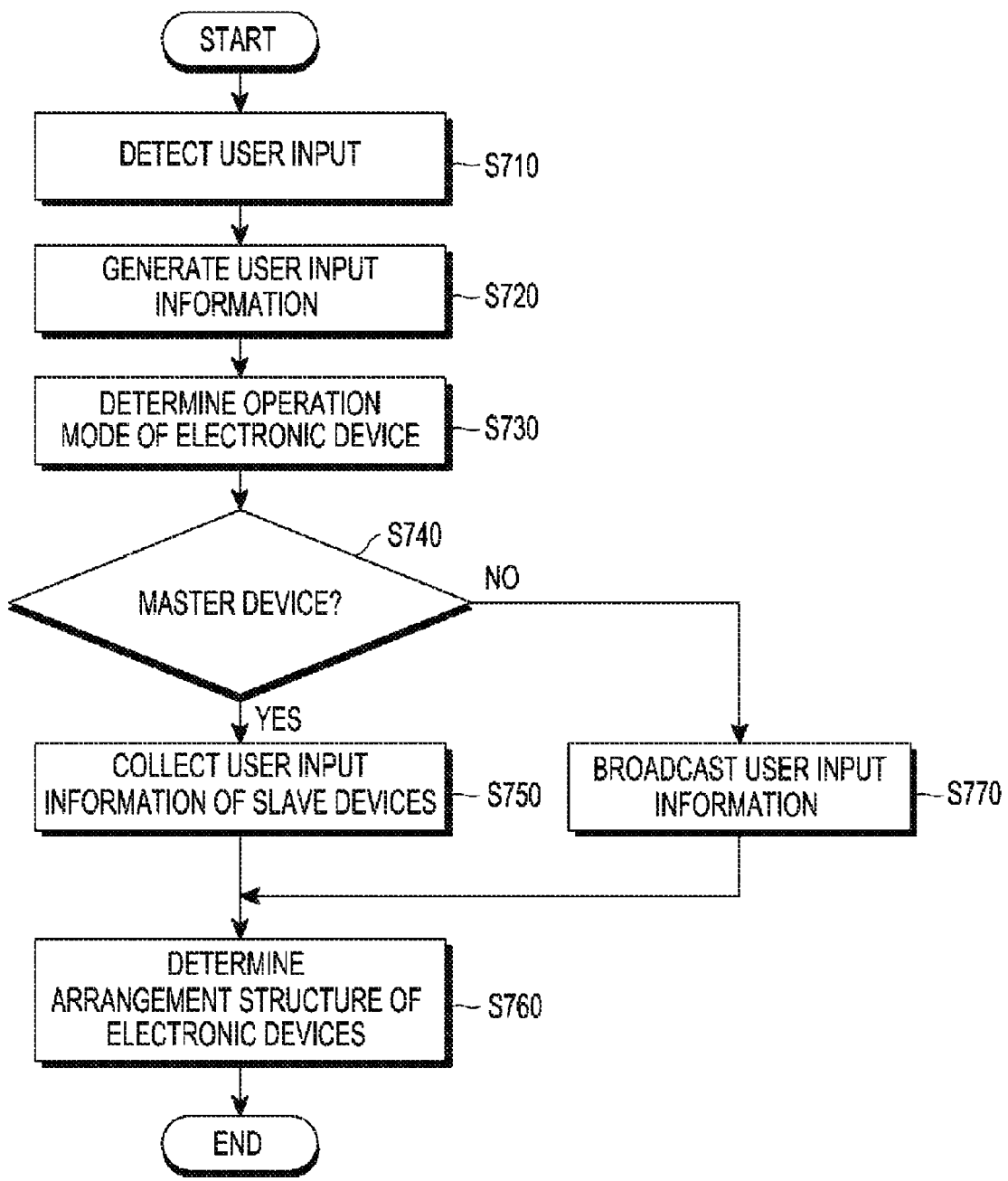
FIGS. 7A, 7B, and 7C are flowcharts illustrating a method for configuring a multi-vision structure by an electronic device according to various embodiments of the present disclosure.
Figure 7B:
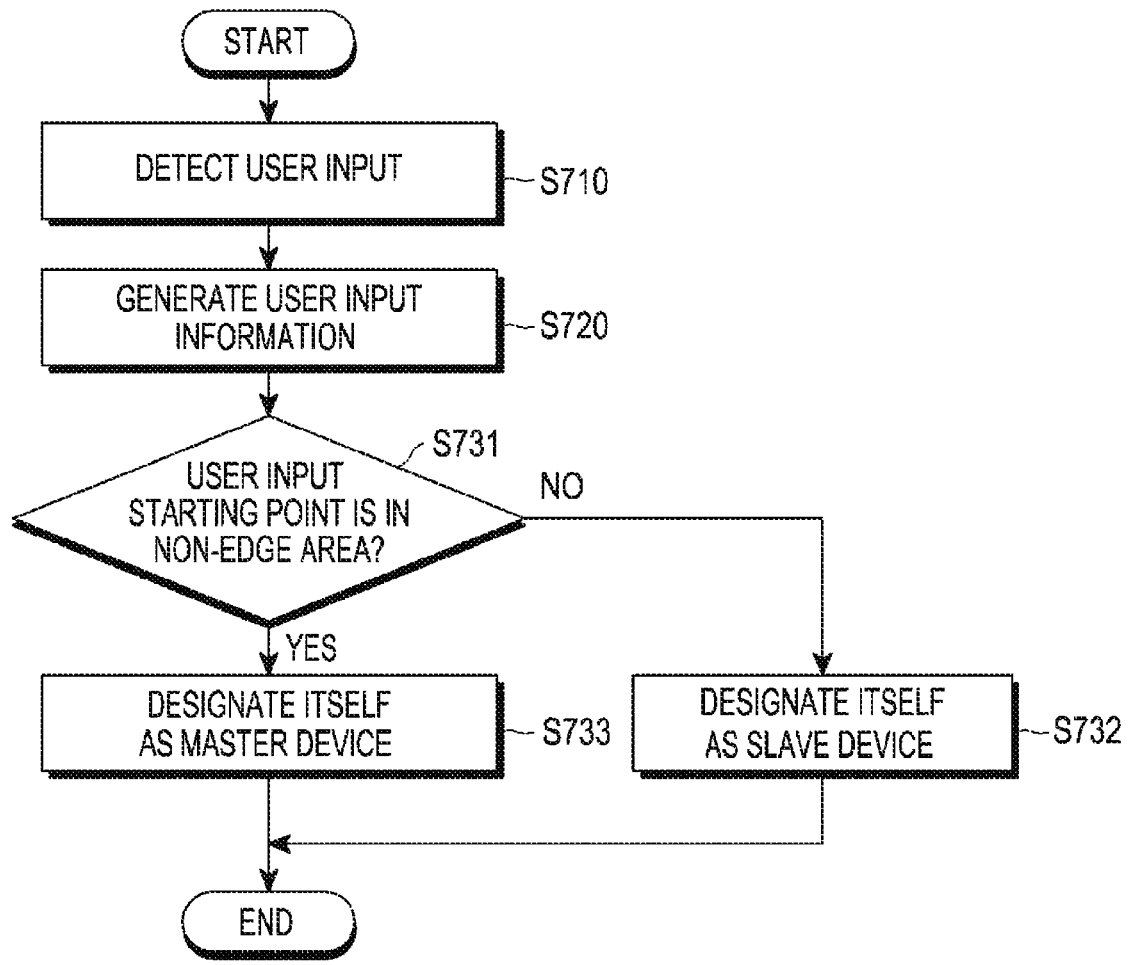
Figure 7C:
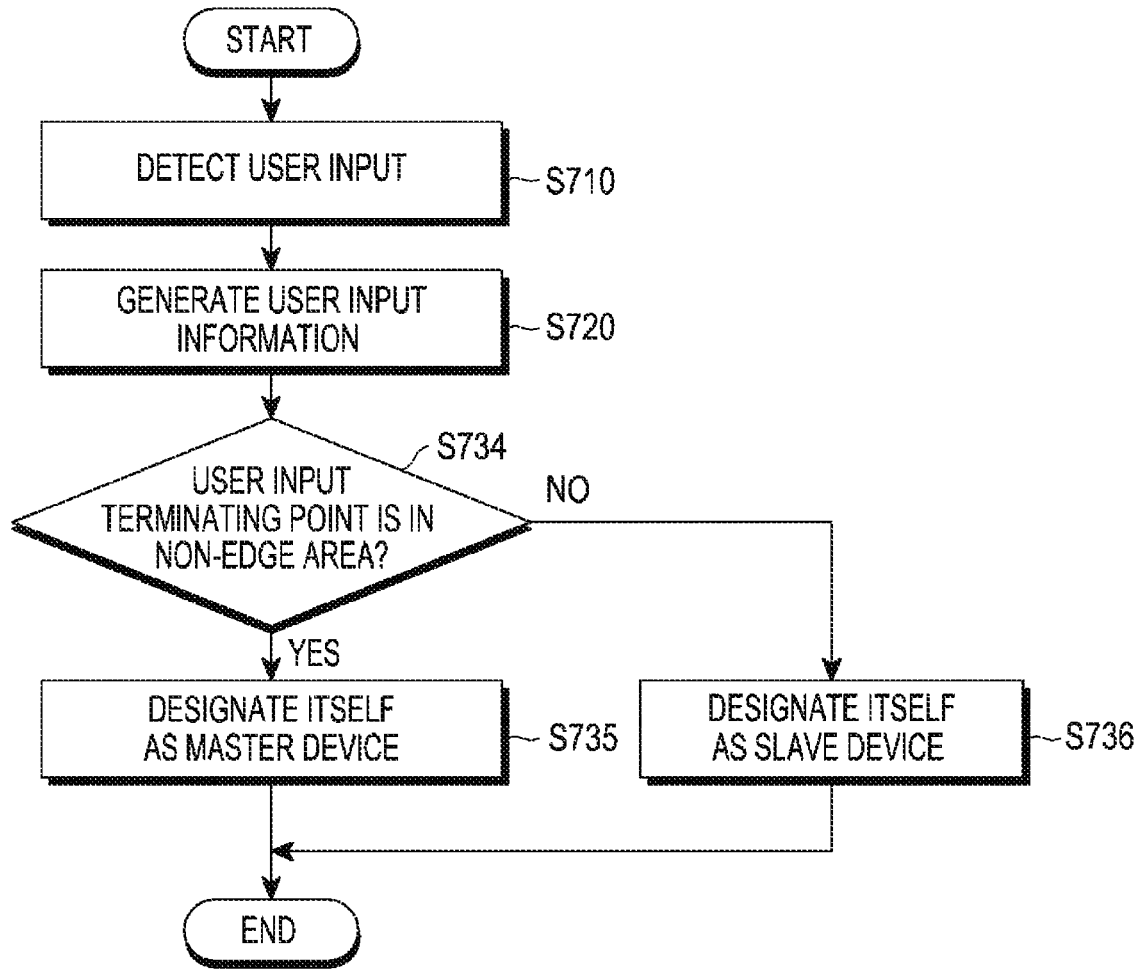

FIGS. 7A to 7C are flowcharts illustrating a method for configuring a multi-vision structure by electronic devices according to various embodiments of the present disclosure.

More specifically, FIG. 7A is a flowchart of an example in which an electronic device determines itself to be either a master device or a slave device according to an embodiment of the present disclosure.

Referring to FIG. 7A, an operation in which an electronic device 100 may detect a user input through a screen 190 is illustrated as operation S710. When the user input is detected, a controller 110 may generate user input information on the electronic device 100 in operation S720. At this time, the user input information may include at least one of a time (an input starting time) when the user input detected in operation S710 starts, a time (an input terminating time) when the user input terminates, a point (an input starting point) where the user input starts on the screen 190, and a point (an input terminating point) where the user input terminates. The user input information may further include resolution information of the electronic device 100.

When the user input information is generated, the controller 110 may determine an operation mode of the electronic device 100 in operation S730. In operation S730, the controller 110 may determine whether the electronic device 100 operates as a master device or a slave device to thereby determine an operation mode of the electronic device 100. With the determination of the operation mode, the controller 110 may determine whether or not the electronic device 100 is the master device in operation S740.

If the electronic device 100 is the master device in operation S740 ("Yes" in operation S740), the controller 110 of the electronic device 100 that is determined to be the master device may control a communication interface 120 to collect the user input information of other electronic devices, i.e., slave devices in operation S750. According to the embodiment, in operation S750, the controller 110 of the electronic device 100 may control the communication interface 120 to request the slave devices to transmit the user input information of each slave device, and to receive the same. According to another embodiment of the present disclosure, the controller 110 of the electronic device 100 may control the communication interface 120 to receive the user input information that is broadcast from each slave device in operation S750.

When the user input information of the slave devices is collected, the controller 110 of the electronic device 100 which is the master device may determine the arrangement structure of the devices including the slave devices in operation S760. The arrangement structure determined by the electronic device 100 in operation S760 may be a multi-vision structure. In addition, according to the embodiment, after operation S760, the controller 110 of the electronic device 100 may control the electronic device 100 to generate and transmit notification data to inform the slave devices of the arrangement structure determined in operation S760.

If the electronic device 100 is not the master device as a result of the determination in operation S740, that is, if the electronic device 100 is a slave device ("NO" in operation S740), the controller 110 of the electronic device 100 that is determined to be a slave device may control the communication interface 120 to broadcast the user input information generated in operation S720 in operation S770. According to the embodiment, in operation S770, the controller 110 of the electronic device 100 may receive a request for transmission of the user input information from the other electronic device that is a master device. In a case of receiving the request for transmission of the user input information as described above, the controller 110 of the electronic device 100 may transmit the user input information to the master device.

FIG. 7B, a flowchart of an example of determining one operation mode of a master device or a slave device by an electronic device according to an embodiment of the present disclosure. FIG. 7B shows more detailed operations of S730 in FIG. 7A in which an operation mode of an electronic device is determined.

Referring to FIG. 7B, an operation in which an electronic device 100 may detect a user input through a screen 190 is illustrated as operation S710. When the user input is detected, a controller 110 may generate user input information in operation S720. At this time, the user input information may include at least one of a time when the user input detected in operation S710 starts, a time when the user input terminates, a point where the user input starts on the screen 190, and a point where the user input terminates. The user input information may further include resolution information of the electronic device 100.

When the user input information is generated, the controller 110 may determine an input starting point of the user input among the user input information generated in operation S720 is in a non-edge area in operation S731. If the input starting point of the user input is in the non-edge area as a result of the determination in operation S731 ("YES" in operation S731), the controller 110 of the electronic device 100 may determine that the electronic device 100 itself is the master device in operation S733. If the input starting point of the user input is not in the non-edge area as a result of the determination in operation S731 ("NO" in operation S731), the controller 110 of the electronic device 100 may determine that the electronic device 100 itself is the slave device in operation S732.

As described above, the electronic device 100 according to an embodiment of the present disclosure may determine itself to be the master device when the non-edge-to-edge input is received from the user. In addition, the electronic device 100 may determine itself to be the slave device when the edge-to-non-edge input is received from the user.

According to another embodiment of the present disclosure, the electronic device 100 may be determined to be the master device or the slave device during the mutual connection process before operation S710 that is, before detecting the user input.

FIG. 7C is a flowchart of another example of determining an operation mode of a master device or a slave device by an electronic device according to an embodiment of the present disclosure. FIG. 7C shows more detailed operations of S730 in FIG. 7A in which an operation mode of an electronic device is determined.

Referring to FIG. 7C, an operation in which an electronic device 100 may detect a user input through a screen 190 is illustrated as operation S710. When the user input is detected, a controller 110 may generate user input information in operation S720. At this time, the user input information may include at least one of a time when the user input detected in operation S710 starts, a time when the user input terminates, a point where the user input starts on the screen 190, and a point where the user input terminates. The user input information may further include resolution information of the electronic device 100.

When the user input information is generated, the controller 110 may determine an input terminating point of the user input among the user input information generated in operation S720 is in a non-edge area in operation S734. If the input terminating point of the user input is in the non-edge area as a result of the determination in operation S734 ("YES" in operation S734), the controller 110 of the electronic device 100 may determine that the electronic device 100 itself is the master device in operation S735. If the input terminating point of the user input is not in the non-edge area as a result of the determination in operation S734 ("NO" in operation S734), the controller 110 of the electronic device 100 may determine that the electronic device 100 itself to is the slave device in operation S736.

As described above, the electronic device 100 according to an embodiment of the present disclosure may determine itself to be the master device when a non-edge-to-edge input is received from the user. In addition, the electronic device 100 may determine itself to be the slave device when an edge-to-edge input or an edge-to-non-edge input is received from the user.

According to another embodiment of the present disclosure, the electronic device 100 may be determined to be the master device or the slave device during the mutual connection process before operation S710 that is, before detecting the user input.

Figures 8A, 8B:
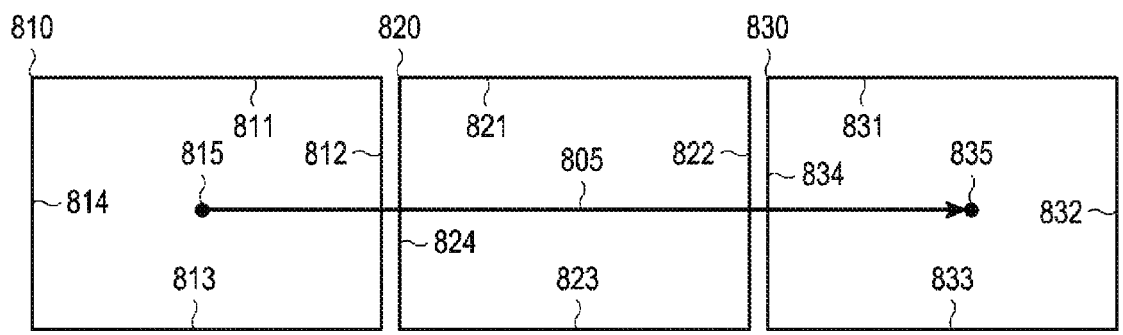
FIGS. 8A, 8B, and 8C illustrate examples of configuring a multi-vision structure by using electronic devices according to various embodiments of the present disclosure.
Figure 8C:
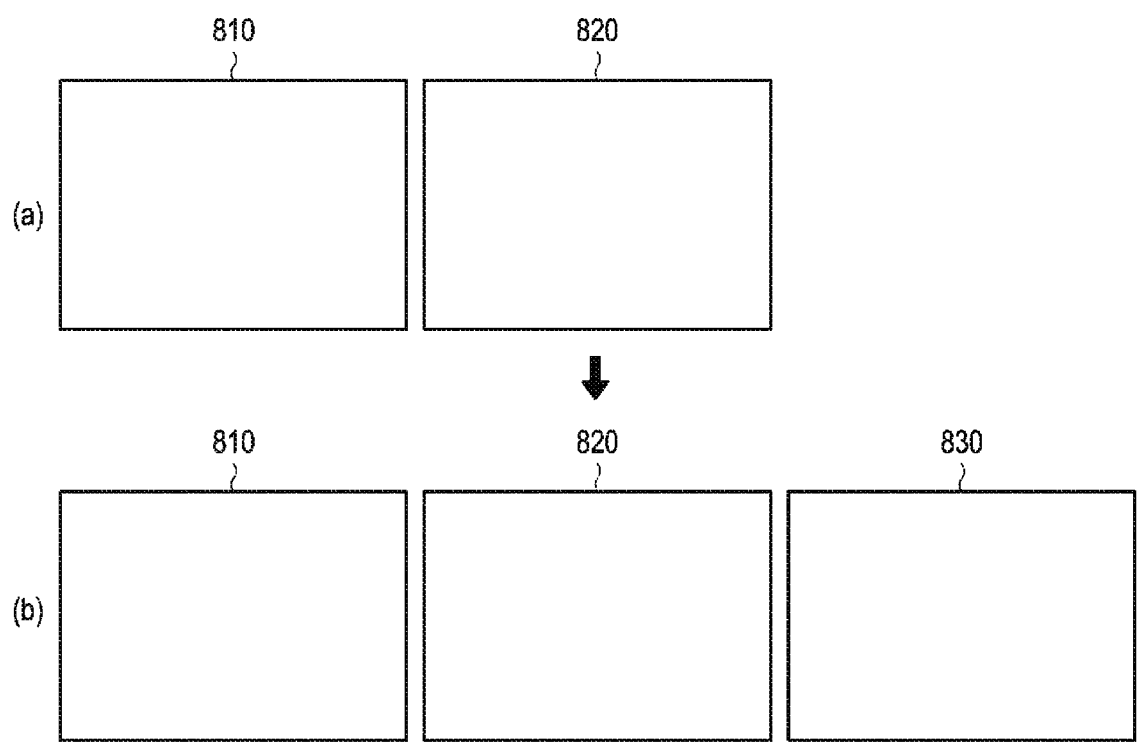

FIGS. 8A to 8C illustrate examples of configuring a multi-vision structure by using electronic devices according to various embodiments of the present disclosure.

Referring to FIG. 8A, screens 810, 820 and 830 of first to third electronic devices are illustrated. In addition, it is assumed that a user input 805 for configuring a multi-vision structure starts on a first screen 810 of the first electronic device, passes through a second screen 820 of the second electronic device, and terminates on a third screen 830 of the third electronic device. In addition, in the present embodiment, it is assumed that the user arranges the first to the third screens 810, 820 and 830 as shown in FIG. 8A, and then conducts the user input 805 on the first to the third screens 810, 820 and 830 in sequence.

In the present embodiment, the first screen 810 of the first electronic device may include first to fourth edges 811, 812, 813 and 814. The second screen 820 of the second electronic device may include first to fourth edges 821, 822, 823 and

824. The third screen 830 of the third electronic device may include first to fourth edges 831, 832, 833 and 834.

Referring to FIG. 8A, the user input 805 starts at a certain point 815 of the first screen 810 and terminates on the second edge 812 of the first screen 810. Subsequently, the user input 805 starts through the fourth edge 824 of the second screen 820, and terminates on the second edge 822 thereof. Finally, the user input 805 starts on the fourth edge 834 of the third screen 830, and terminates at a certain point 835 thereof. As described above, the user input 805 for connecting the first to the third screens 810, 820 and 830 starts at the certain point 815 of the first screen 810, and terminates at the certain point 835 of the third screen 830 through the second screen 820. Accordingly, the user input 805 on the first screen 810 may be a non-edge-to-edge input, and the user input 805 on the second screen 820 may be an edge-to-edge input. Also, the user input 805 on the third screen 830 may be an edge-to-non-edge input. In addition, as illustrated in FIG. 8B, it is assumed that an input terminating time of the user input 805 on the first screen 810 is t2, an input terminating time of the user input 805 on the second screen 820 is t4, and an input terminating time of the user input 805 on the third screen 830 is t6. In the present embodiment, the input terminating time denotes a time when the user input 805 on each of the first to the third screens 810, 820 and 830 of the first to the third electronic devices, i.e., a drag input, terminates. For example, the input terminating time of the user input 805 on the third screen 830 may be the time when the user stops dragging a finger on the third screen 830.

Each of the first to the third electronic devices may generate information on the user input 805, i.e., user input information. Each of the first to the third electronic devices may determine itself to be either the master device or the slave device based on the user input information. It is assumed that each of the first to the third screens 810, 820 and 830 is a display device that is included in a single electronic device in FIG. 8A. For example, the first screen 810 may be included in the first electronic device, the second screen 820 may be included in the second electronic device, and the third screen 830 may be in the third electronic device. One of the three electronic devices may be the master device, and the remaining two electronic devices may be the slave devices. Each of the slave devices may broadcast or transmit the user input information to the master device. According to the embodiment, the master device may make a request to each slave device for the user input information and receive the user input information of each slave device. For example, the first electronic device which is the master device may collect the user input information from each of the slave devices (e.g., the second electronic device and the third electronic device).

The master device (e.g., the first electronic device) that has received the user input information from the slave devices may analyze the user input information and determine a multi-vision structure of the first to the third electronic devices.

Referring to FIG. 8B, a table 850 of user input information of first to third electronic devices is illustrated, where the user input information is collected and arranged by a master device. It is assumed that the user input information includes an input terminating time and an input terminating point of the user input in each electronic device in the present embodiment. In the present embodiment, it is assumed that the table 850 is arranged according to the input terminating time.

An electronic device 100 according to various embodiments of the present disclosure may determine directions of first to fourth edges 811 to 814, 821 to 824, and 831 to 834 according to a display direction. More specifically, the first electronic device of FIG. 8A may determine that the first edge 811 of the first screen 810 is a top edge, the second edge 812 is a right edge, the third edge 813 is a bottom edge, and the fourth edge 814 is a left edge, respectively.

The table 850 of FIG. 8B shows an input terminating time t2 of a user input 805 on the first screen 810, an input terminating time t4 of the user input 805 on the second screen 820, and an input terminating time t6 of the user input 805 on the third screen 830. In addition, the table 850 of FIG. 8B shows a right edge direction of the input terminating point of the user input 805 on the first screen 810, a right edge direction of the input terminating point of the user input 805 on the second screen 820, and a middle edge direction of the input terminating point of the user input 805 on the third screen 830. That is, an edge at the input terminating point on the first screen 810 is the right edge, and an edge at the input terminating point on the second screen 820 is the right edge. Also, the input terminating point on the third screen 830 is in a non-edge area.

The master device according to the present embodiment may determine the arrangement sequence of the first to the third screens 810, 820 and 830 based on the user input information of FIG. 8B to thereby determine the multi-vision structure.

Referring to FIG. 8C, a determination of a multi-vision structure of first to third screens 810, 820 and 830 according to an input sequence of a user input 805 based on collected user input information is illustrated.

A master device (e.g., a first electronic device) may determine an arrangement of a first electronic device including the first screen 810 and a second electronic device including the second screen 820 based on a first row and a second row of a table 850 illustrated in FIG. 8B. More specifically, the master device may recognize that an input terminating point of the first electronic device is on a right edge with reference to a first row of the table 850 illustrated in FIG. 8B, and the electronic device next to the first electronic device is the second electronic device with reference to the second row thereof. Based on the above user input information, a controller of the master device (e.g., a controller 110 of the first electronic device) may determine that the second electronic device including the second screen 820 is disposed on the right side of the first electronic device including the first screen 810 as shown in diagram (a) of FIG. 8C.

In addition, the master device (e.g., the first electronic device) may determine the arrangement of the second electronic device including the second screen 820 and the third electronic device including the third screen 830 based on the second row and a third row of the table 850 in FIG. 8B. More specifically, the master device may recognize that the input terminating point of the second electronic device is on the right edge with reference to the second row of FIG. 8B, and the electronic device next to the second electronic device is the third electronic device with reference to the third row thereof. Based on the above user input information, the controller of the master device may determine that the third electronic device including the third screen 830 is disposed on the right side of the second electronic device including the second screen 820 as shown in diagram (b) of FIG. 8C.

Finally, the master device may determine the final arrangement of the screens 810, 820 and 830 based on the third row of the table 850 in FIG. 8B. More specifically, the master device may recognize that the input terminating point of the third electronic device is in the middle of the screen with reference to the third row of FIG. 8B, and then determine that the third electronic device is the last electronic device for arrangement according to the user input information.

According to another embodiment of the present disclosure, an input terminating time may be replaced with an input starting time in the above description. In addition, an input terminating point may be replaced with an input starting point in the above description. More specifically, when the input terminating point is replaced with the input starting point, the master device (e.g., the first electronic device) may determine that the electronic device (e.g., the first electronic device) of the first row of the table 850 is disposed in the edge direction (e.g., the left edge) of the input starting point shown in the second row of the table 850.

Figures 9A, 9B:
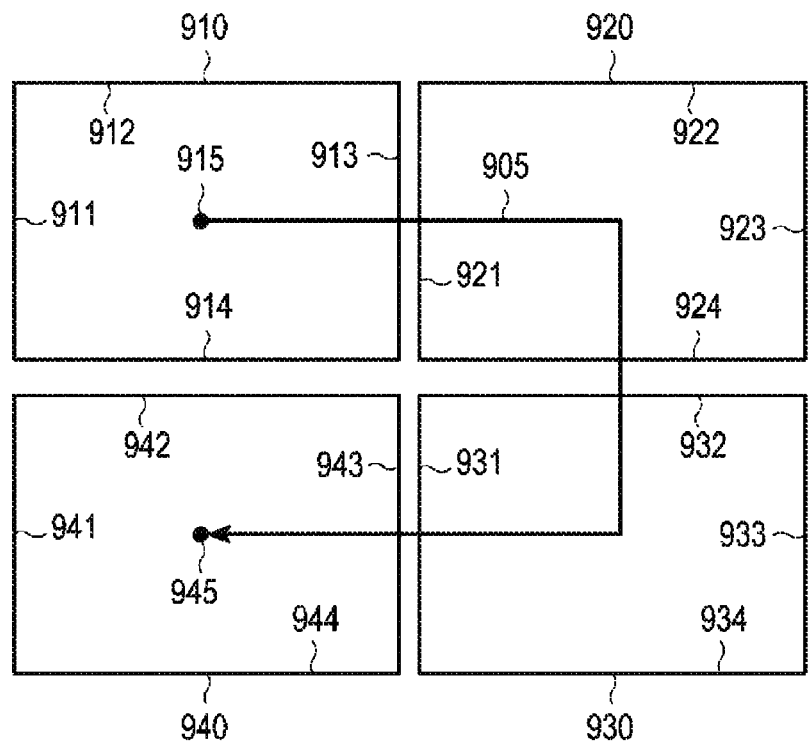
FIGS. 9A, 9B, and 9C illustrate other examples of configuring a multi-vision structure by using electronic devices according to various embodiments of the present disclosure.
Figure 9C:
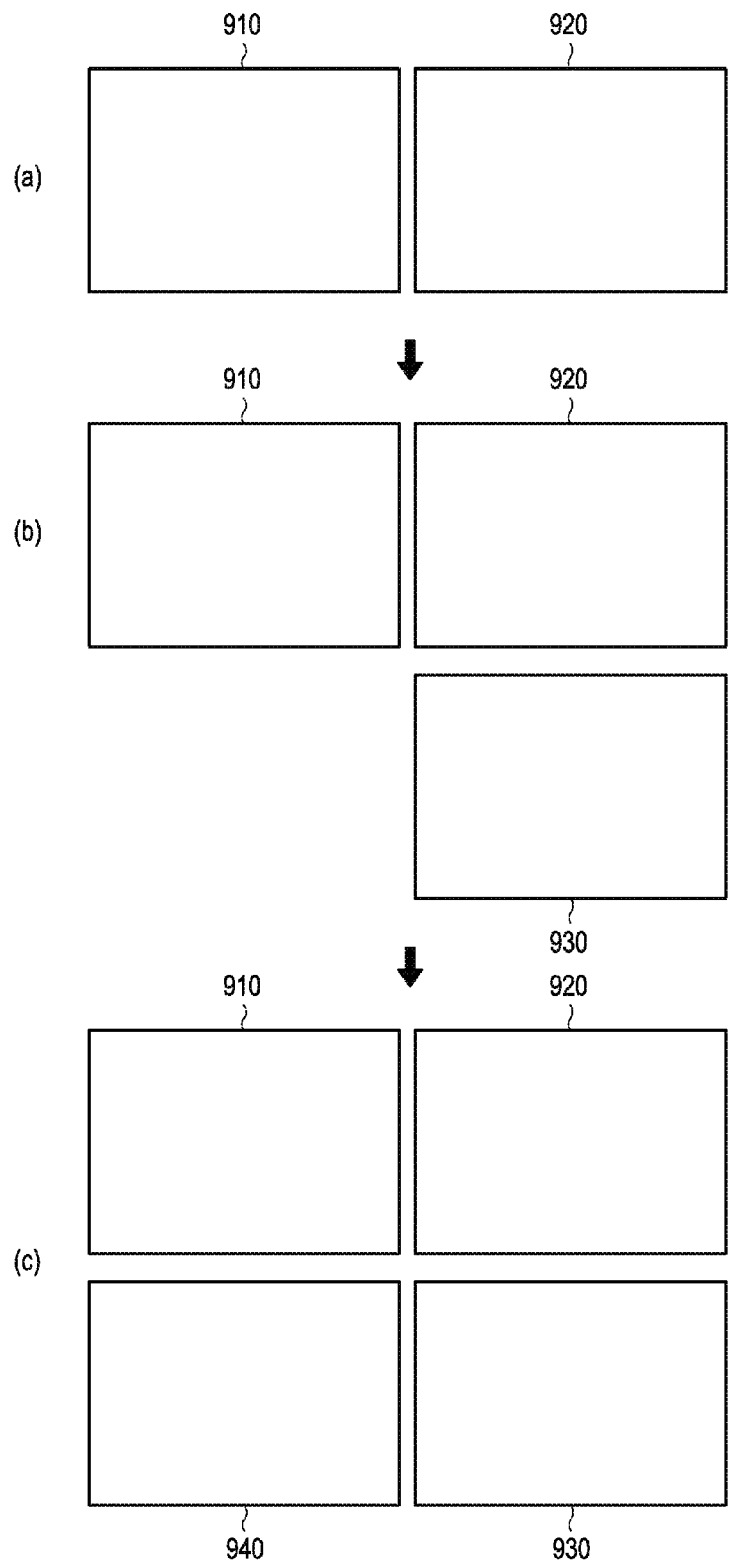

FIGS. 9A to 9C illustrate other examples of configuring a multi-vision structure by using electronic devices according to various embodiments of the present disclosure.

Referring to FIG. 9A, a first screen 910 of a first electronic device, a second screen 920 of a second electronic device, a third screen 930 of a third electronic device, and a fourth screen 940 of a fourth electronic device are illustrated. In addition, it is assumed that a user input 905 for configuring a multi-vision structure starts on the first screen 910 of the first electronic device, and then passes through the second screen 920, the third screen 930, and the fourth screen 940. In addition, it is assumed that the user arranges the first to the fourth screens 910, 920, 930 and 940 as shown in FIG. 9A, and conducts the user input 905 on the first to the fourth screens 910, 920, 930 and 940 in sequence. The first screen 910 includes a first edge 911, a second edge 912, a third edge 913 and a fourth edge 914, the second screen 920 includes a first edge 921, a second edge 922, a third edge 923 and a fourth edge 924, the third screen 930 includes a first edge 931, a second edge 932, a third edge 933 and a fourth edge 934, and the fourth screen 940 includes a first edge 941, a second edge 942, a third edge 943 and a fourth edge 944.

More specifically, the user input 905 starts at a certain point 915, i.e., in a non-edge area of the first screen 910, and terminates on the third edge 913 thereof in the first electronic device. Subsequently, the user input 905 starts on the first edge 921 of the second screen 920, and terminates on the fourth edge 924 thereof in the second electronic device. Further, the user input 905 starts on the second edge 932 of the third screen 930, and terminates on the first edge 931 thereof in the third electronic device. Finally, the user input 905 starts on the third edge 943 of the fourth screen 940, and terminates at a certain point 945 thereof in the fourth electronic device. That is, the user input 905 on the first screen 910 is a non-edge-to-edge input, and the user inputs 905 on the second screen 920 and the third screen 930 are edge-to-edge inputs. Also, the user input 905 on the fourth screen 940 is an edge-to-non-edge input.

In addition, it is assumed that an input terminating time of the user input 905 on the first screen 910 is t1, an input terminating time of the user input 905 on the second screen 920 is t2, an input terminating time of the user input 905 on the third screen 930 is t3, and an input terminating time of the user input 905 on the fourth screen 940 is t4, as illustrated in FIG. 9B.

Referring to FIG. 9B, a table 960 of user input information of first to the fourth electronic devices is illustrated. As described above, an electronic device (e.g., a first electronic device) that is determined to be a master device may collect user input information as shown in table 960 of FIG. 9B from slave devices (e.g., a second electronic device, a third electronic device, and a fourth electronic device).

The master device (e.g., the first electronic device) that has collected the user input information from the slave devices may analyze the user input information and determine the multi-vision structure of the first to the fourth electronic devices.

FIG. 9C illustrates that a master device determines a multi-vision structure of first to fourth electronic devices 910, 920, 930 and 940 on collected user input information.

A controller (e.g., controller 110) of the master device (e.g., the first electronic device) may determine the arrangement of the first electronic device including a first screen 910 and the second electronic device including a second screen 920 based on a first row and a second row of the table 960 in FIG. 9B. More specifically, the master device may recognize that the input terminating point of the first electronic device is on a right edge with reference to the first row of FIG. 9B, and the electronic device next to the first electronic device is the second electronic device with reference to the second row thereof. Based on the above information, the controller of the master device may determine that the second electronic device including the second screen 920 is disposed on the right side of the first electronic device including the first screen 910 as shown in diagram (a) of FIG. 9C.

In addition, the controller of the master device may determine the arrangement of the second electronic device including the second screen 920 and the third electronic device including a third screen 930 based on the second row and a third row of the table 960 in FIG. 9B. More specifically, the master device may recognize that the input terminating point of the second electronic device is on a bottom edge with reference to the second row of FIG. 9B, and the electronic device disposed next to the second electronic device is the third electronic device with reference to the third row thereof. Based on the information, the controller of the master device may determine that the third electronic device including the third screen 930 is disposed below the second electronic device including the second screen 920 as shown in diagram (b) of FIG. 9C.

Further, the controller of the master device may determine the arrangement of the third electronic device including the third screen 930 and a fourth electronic device including a fourth screen 940 based on the third row and a fourth row of the table 960 in FIG. 9B. More specifically, the master device may recognize that the input terminating point of the third electronic device is on a left edge of the screen with reference to the third row of FIG. 9B, and the fourth electronic device is disposed next to the third electronic device with reference to the fourth row thereof. Based on the above information, the controller of the master device may determine that the fourth electronic device including the fourth screen 940 is disposed on a left side of the third electronic device including the third screen 930 as shown in diagram (c) of FIG. 9C.

Finally, the controller of the master device may determine the final arrangement based on the fourth row of the table 960 in FIG. 9B. More specifically, the master device may recognize that the input terminating point of the fourth electronic device is in a middle of the screen with reference to the fourth row of FIG. 9B, and then determine that the fourth electronic device is a last electronic device to be disposed according to the information.

In the above description, an input terminating time may be replaced with an input starting time. In addition, an input terminating point may be replaced with an input starting point in the above description. More specifically, when the input terminating point is replaced with the input starting point, the master device (e.g., the first electronic device) may determine that the electronic device (e.g., the first electronic device) of the first row of the table 960 is disposed in the edge direction (e.g., on the left edge) of the input starting point of the second row.

Figures 10A, 10B:
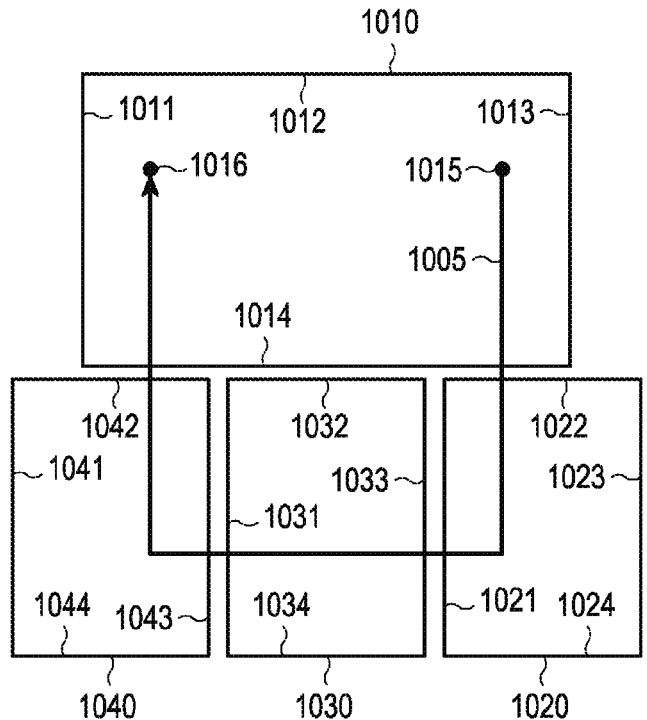
FIGS. 10A, 10B, and 10C illustrate other examples of configuring a multi-vision structure by using electronic devices according to various embodiments of the present disclosure.
Figure 10C:
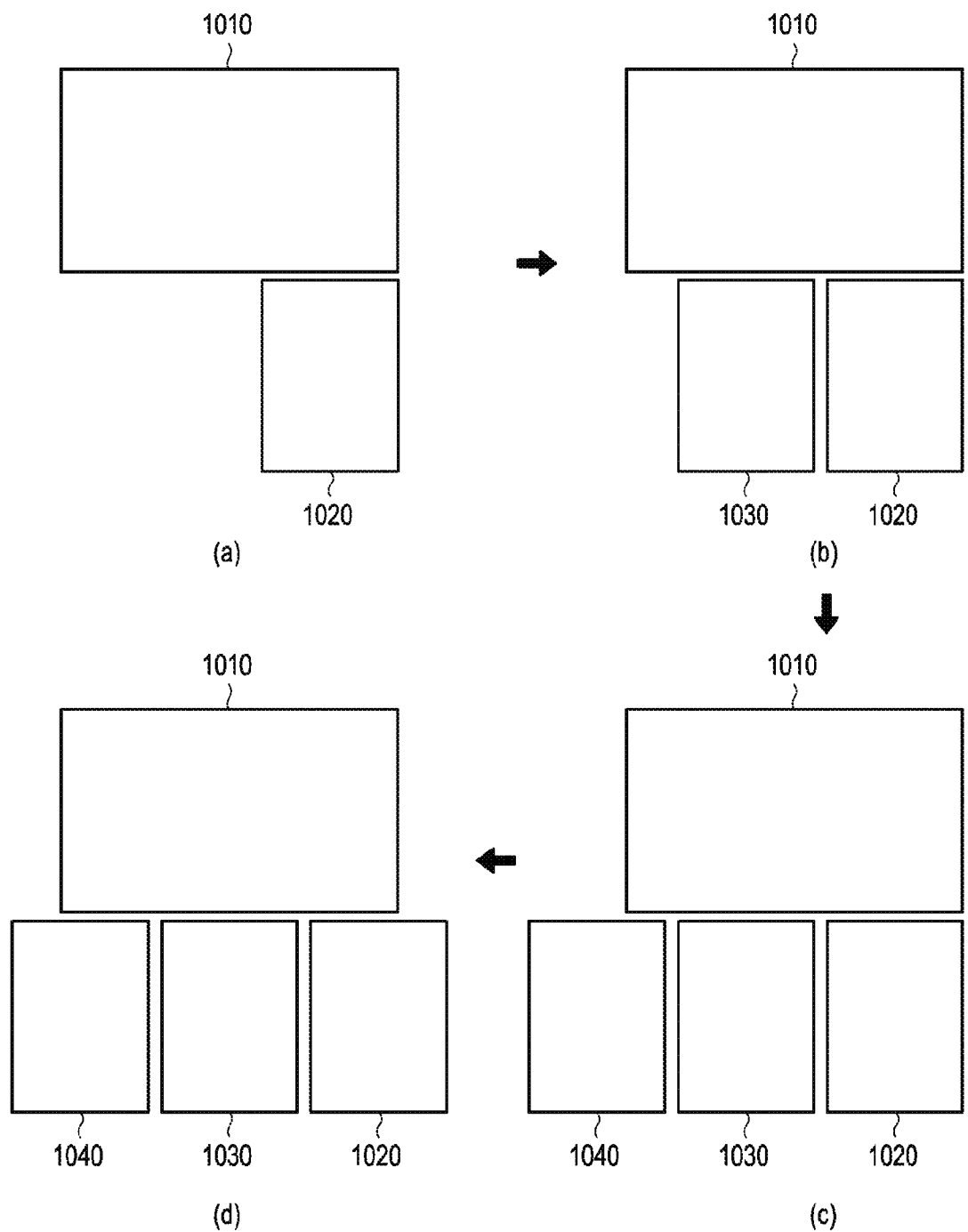

FIGS. 10A to 10C illustrate other examples of configuring a multi-vision structure by using electronic devices according to various embodiments of the present disclosure.

Referring to FIG. 10A, first to fourth screens 1010, 1020, 1030 and 1040 of first to fourth electronic devices, respectively, are illustrated. In addition, it is assumed that a user input 1005 for configuring the multi-vision structure starts on the first screen 1010 of the first electronic device, passes through the second screen 1020 of the second electronic device, the third screen 1030 of the third electronic device, and the fourth screen 1040 of the fourth electronic device, and then terminates on the first screen 1010 of the first electronic device. In addition, it is assumed that the user arranges the first to the fourth screens 1010, 1020, 1030 and 1040 as shown in FIG. 10A, and conducts the user input 1005 on the first to the fourth screens 1010, 1020, 1030 and 1040. The first screen 1010 includes a first edge 1011, a second edge 1012, a third edge 1013 and a fourth edge 1014, the second screen 1020 includes a first edge 1021, a second edge 1022, a third edge 1023 and a fourth edge 1024, the third screen 1030 includes a first edge 1031, a second edge 1032, a third edge 1033 and a fourth edge 1034, and the fourth screen 1040 includes a first edge 1041, a second edge 1042, a third edge 1043 and a fourth edge 1044.

More specifically, the user input 1005 starts at a certain point 1015 of the first screen 1010 and terminates on the fourth edge 1014 thereof in the first electronic device. Subsequently, the user input 1005 starts on the second edge 1022 of the second screen 1020, and terminates on the first edge 1021 thereof in the second electronic device. Next, the user input 1005 starts on the third edge 1033 of the third screen 1030, and terminates on the first edge 1031 thereof in the third electronic device. Next, the user input 1005 starts on the third edge 1043 of the fourth screen 1040, and terminates on the second edge 1042 thereof in the fourth electronic device. Finally, the user input 1005 starts on the fourth edge 1041 of the first screen 1010, and terminates at a certain point 1016 that is in a non-edge area. That is, the first user input 1005 on the first screen 1010 is a non-edge-to-edge input, and the user inputs 1005 on the second screen 1020, the third screen 1030, and the fourth screen 1040 are edge-to-edge inputs. Also, the second user input 1005 on the first screen 1010 is an edge-to-non-edge input.

In addition, it is assumed that an input terminating time of the first user input 1005 on the first screen 1010 is t1, an input terminating time of the user input 1005 on the second screen 1020 is t2, an input terminating time of the user input 1005 on the third screen 1030 is t3, an input terminating time of the user input 1005 on the fourth screen 1040 is t4, and an input terminating time of the second user input 1005 on the first screen 1010 is t5, as illustrated in FIG. 10B. Each of the first to the fourth electronic devices may generate information on the user input 1005, i.e., user input information.

Referring to FIG. 10B, a table 1060 of user input information of first to fourth electronic devices is illustrated. According to the above-described method, an electronic device (e.g., a first electronic device) that is determined to be a master device may collect the user input information as shown in the table 1060 of FIG. 10B from slave devices (e.g., a second electronic device, a third electronic device, and a fourth electronic device).

The master device (e.g., the first electronic device) that has collected the user input information from the slave devices may analyze the user input information and determine the multi-vision structure of the first to the fourth electronic devices. FIG. 10C illustrates that a master device (e.g., a first electronic device) determines the multi-vision structure of first to fourth screens 1010, 1020, 1030 and 1040 based on collected user input information.

According to the above-described method, a controller (e.g., controller 110) of the master device may determine that the second electronic device including the second screen 1020 is disposed below the first electronic device including the first screen 1010 as shown in diagram (a) of FIG. 10C with reference to a first row and a second row of the table 1060 in FIG. 10B. In addition, the controller of the master device may determine that the third electronic device including the third screen 1030 is disposed on a left side of the second electronic device including the second screen 1020 as shown in diagram (b) of FIG. 10C with reference to the second row and a third row of the table 1060. Subsequently, the controller of the master device may determine that the fourth electronic device including the fourth screen 1040 is disposed on the left side of the third electronic device including the third screen 1030 as shown in diagram (c) of FIG. 10C with reference to the third row and a fourth row of the table 1060.

Further, the controller of the master device according to an embodiment of the present disclosure may determine that the first electronic device including the first screen 1010 is disposed above the fourth electronic device including the fourth screen 1040 with reference to the fourth row and the fifth row of the table 1060. At this time, the controller of the master device may adjust the locations of the screens as shown in diagram (d) of FIG. 10C in consideration of the resolution of the first to the fourth electronic devices, considering that the first electronic device is listed in the first row of the table 1060.

That is, in a case where the user input 1005 that terminates in a non-edge area on the fourth screen 1040, a final multi-vision structure may be the same as diagram (c) of FIG. 10C. In addition, in a case where the user input 1005 that proceeds from the fourth screen 1040 to the first screen 1010 and terminates in the non-edge area 1016 on the first screen 1010, the final multi-vision structure may be the same as diagram (d) of FIG. 10C.

Figures 11A, 11B:
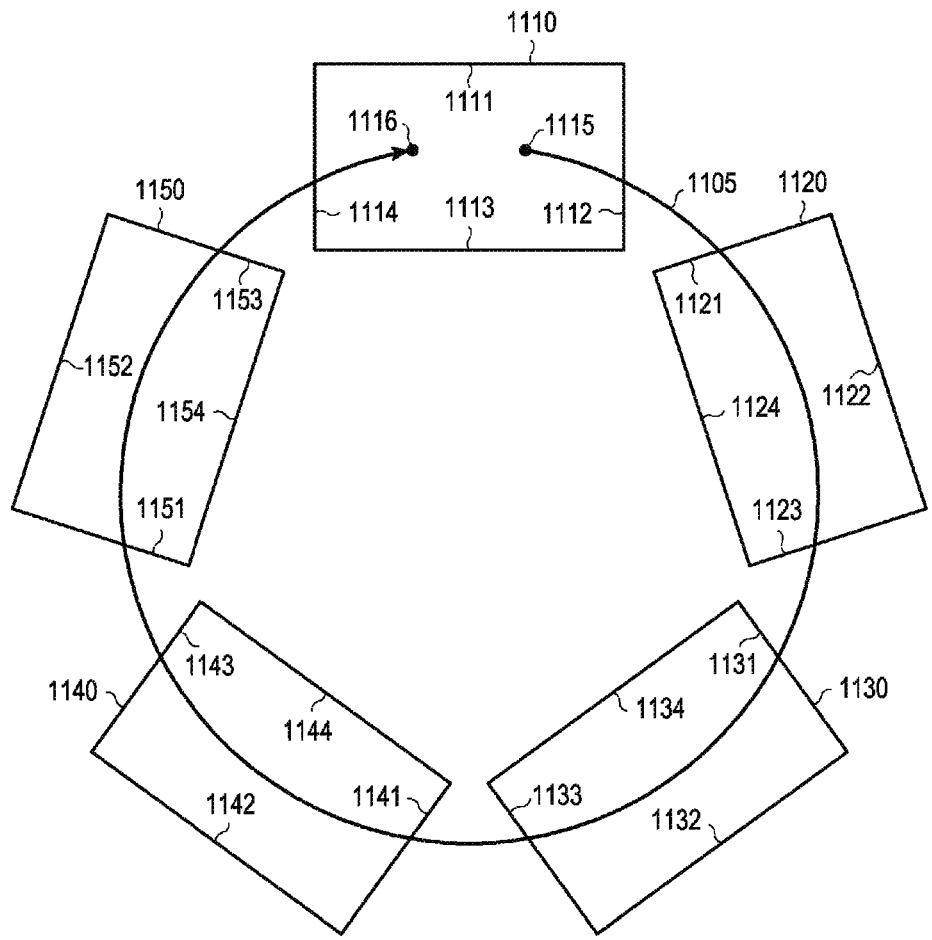
FIGS. 11A and 11B illustrate other examples of configuring a multi-vision structure by using electronic devices according to various embodiments of the present disclosure.

FIGS. 11A and 11B illustrate other examples of configuring a multi-vision structure by using electronic devices according to various embodiments of the present disclosure.

Referring to FIG. 11A, screens 1110, 1120, 1130, 1140 and 1150 of first to fifth electronic devices are illustrated. In addition, it is assumed that a user input 1105 for configuring the multi-vision structure starts on the first screen 1110 of the first electronic device, passes through the second screen 1120 of the second electronic device, the third screen 1130 of the third electronic device, the fourth screen 1140 of the fourth electronic device and the fifth screen 1150, and terminates on the first screen 1110 of the first electronic device. In addition, it is assumed that the user arranges the first to the fifth screens 1110, 1120, 1130, 1140 and 1150 as shown in FIG. 11A, and conducts the user input 1105 on the first to the fifth screens 1110, 1120, 1130, 1140 and 1150 in sequence. The first screen 1110 includes a first edge 1111, a second edge 1112, a third edge 1113 and a fourth edge 1114, the second screen 1120 includes a first edge 1121, a second edge 1122, a third edge 1123 and a fourth edge 1124, the third screen 1130 includes a first edge 1131, a second edge 1132, a third edge 1133 and a fourth edge 1134, the fourth screen 1140 includes a first edge 1141, a second edge 1142, a third edge 1143 and a fourth edge 1144, and the fifth screen 1150 includes a first edge 1151, a second edge 1152, a third edge 1153 and a fourth edge 1154.

More specifically, the user input 1105 starts at a certain point 1115 on the first screen 1110 and terminates on the second edge 1112 thereof in the first electronic device. Subsequently, the user input 1105 starts on the first edge 1121 of the second screen 1120, and terminates on the third edge 1123 thereof in the second electronic device. Further, the user input 1105 starts through the first edge 1131 on the third screen 1130, and terminates on the third edge 1133 thereof in the third electronic device. Next, the user input 1105 starts through the first edge 1141 of the fourth screen 1140, and terminates on the third edge 1143 thereof in the fourth electronic device. Next, the user input 1105 starts through the first edge 1151 of the fifth screen 1150, and terminates on the third edge 1153 thereof in the fifth electronic device. Finally, the user input 1105 starts through the fourth edge 1114 of the first screen 1110, and terminates at a certain point 1116 thereon in the first electronic device.

That is, the first user input 1105 on the first screen 1110 is a non-edge-to-edge input, and the user inputs 1105 on the second screen 1120, the third screen 1130, the fourth screen 1140 and the fifth screen 1150 are edge-to-edge inputs. Also, the second user input 1105 on the first screen 1110 is an edge-to-non-edge input.

In addition, it is assumed that an input terminating time of the first user input 1105 on the first screen 1110 is t1, an input terminating time of the user input 1105 on the second screen 1120 is t2, an input terminating time of the user input 1105 on the third screen 1130 is t3, an input terminating time of the user input 1105 on the fourth screen 1140 is t4, an input terminating time of the user input 1105 on the fifth screen 1150 is t5, and an input terminating time of the second user input 1105 on the first screen 1110 is t6, as illustrated in FIG. 11B.

Each of the first to the fifth electronic devices may generate information on the user input 1105, i.e., user input information. FIG. 11B shows a table 1170 of user input information of first to fifth electronic devices. As described above, an electronic device (e.g., a first electronic device) that is determined to be the master device may collect the user input information as shown in the table 1170 of FIG. 11B from slave devices (e.g., second to fifth electronic devices).

The master device (e.g., the first electronic device) that has collected the user input information from the slave devices may analyze the user input information and determine the multi-vision structure of the first to the fifth electronic devices.

According to the above-described method, a controller (e.g., controller 110) of the master device may determine that the second electronic device including a second screen 1120, the third electronic device including a third screen 1130, the fourth electronic device including a fourth screen 1140, and the fifth electronic device including a fifth screen 1150 are disposed on a right side of the first electronic device including a first screen 1110 in sequence with reference to first and second rows, the second and third rows, the third and fourth rows, and the fourth and fifth rows of the table 1170 in FIG. 11B.

Further, the controller (e.g., the controller 110) of the master device (e.g., the first electronic device) according to an embodiment of the present disclosure may determine that the first to the fifth electronic devices are disposed in a circle, considering that a screen in a sixth row is the same as the screen in the first row, and edges of the input terminating points in all the rows except for the sixth row that records the same screen as that of the first row are identical, i.e., the right edges, to each other in the table 1170.

That is, in the above-described embodiment, in a case where the user input 1105 that terminates in the non-edge area on the fifth screen 1150, the final multi-vision structure may be linear. According to an embodiment of the present disclosure, in a case where the user input 1105 that proceeds from the fifth screen 1150 to the first screen 1110 to terminate in the non-edge area 1016 on the first screen 1010, if the first input terminating point of the first screen 1110 to the input terminating point of the fifth screen 1150 are identical to each other, the first to the fifth screens 1110, 1120, 1130, 1140 and 1150 may be arranged in a circle.

In the present embodiment, the circular arrangement of the screens (e.g., the first to the fifth screens 1110, 1120, 1130, 1140 and 1150) may be utilized for configuring a multi-vision to output multi-channel sounds. That is, the master device of the present embodiment may control the first electronic device including the first screen 1110 to output a center channel sound, and the second electronic device including the second screen 1120 to output a front and right channel sound. In addition, the master device may control the third electronic device including the third screen 1130 to output a rear and right channel sound, the fourth electronic device including the fourth screen 1140 to output a rear and left channel sound, and the fifth electronic device including the fifth screen 1150 to output a front and left channel sound FIGS. 12A to 12C illustrate other examples of configuring a multi-vision structure by using electronic devices according to various embodiments of the present disclosure.

Figures 12A, 12B, 12C:
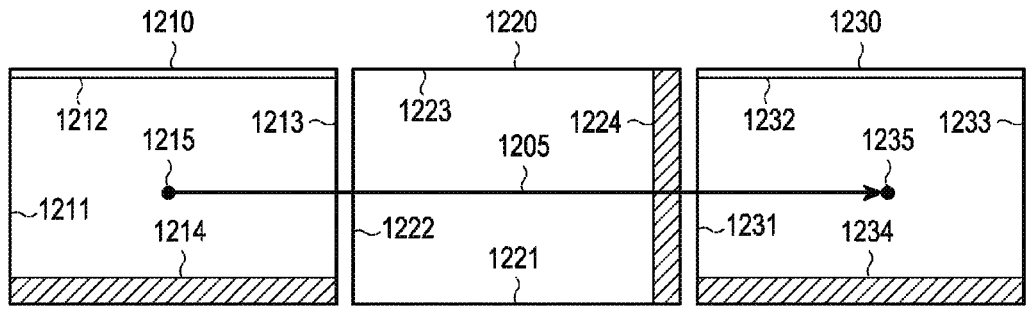
FIGS. 12A, 12B, and 12C illustrate other examples of configuring a multi-vision structure by using electronic devices according to various embodiments of the present disclosure.

Referring to FIG. 12A, screens 1210, 1220 and 1230 of first to third electronic devices are illustrated. In addition, it is assumed that a user input 1205 for configuring the multi-vision structure starts on the first screen 1210 of the first electronic device, and proceeds to the second screen 1220 of the second electronic device and the third screen 1230 of the third electronic device. In addition, it is assumed that the user arranges the first to the third screens 1210, 1220 and 1230 as shown in FIG. 12A, and conducts the user input 1205 on the first to the third screens 1210, 1220 and 1230 in sequence.

Referring to FIG. 12A, the first screen 1210 and the third screen 1230 are configured in a horizontal display mode, and the second screen 1220 is configured in a vertical display mode. The first screen 1210 includes edges 1211, 1212, 1213 and 1214, the second screen 1220 includes edges 1221, 1222, 1223 and 1224, and the third screen 1230 includes edges 1231, 1232, 1233 and 1234.

According to the above-described method, an electronic device (e.g., the first electronic device) that is determined to be a master device may collect the user input information as shown in table 1510 of FIG. 12C from slave devices (e.g., the second electronic device, and the third electronic device).

A controller (e.g., controller 110) of the master device may compare the input terminating point of each row with an input starting point of a next row of the table 1510 to thereby determine whether display modes of electronic devices are identical to each other. If the display modes of the electronic devices are not identical to each other as a result of the determination, the controller of the master device may correct the user input information collected from the electronic devices to make the display modes of the electronic devices identical to each other. More specifically, if the input terminating point of each row is not symmetrical to an input starting point of the next row (e.g., left vs. right, top vs. bottom), the controller of the master device may determine that the display modes of the electronic devices are not identical to each other. If the display modes of the electronic devices are not identical to each other as described above, the controller of the master device may correct the collect user input information with reference to the transformation table 1310 of FIG. 12B.

More specifically, the controller of the master device may perform a first search by which an input terminating point of an electronic device including a screen that is correctly oriented is found from Col 1 in the transformation table 1310 of FIG. 12B. As a result of the first search, the controller of the master device may recognize a row that records an input terminating point of the electronic device including the screen that is correctly oriented in Col 1 of the transformation table 1310 in FIG. 12B (see reference element 1311). Next, the controller of the master device may perform a second search by which the input starting point of the electronic device including the screen that is incorrectly oriented is found from the above row. As a result of the second search, the controller of the master device may determine a Col that records an input starting point of the electronic device including the screen that is incorrectly oriented in the row. Finally, the controller of the master device may correct an input starting point and an input terminating point of the electronic device including the screen that is incorrectly oriented, based on Col 1 and a Col obtained by the second search.

For example, referring to FIG. 12C, the controller of the master device may compare an input terminating point of a first electronic device including a first screen 1210 with an input starting point of a second electronic device including a second screen 1220, with reference to a first row and a second row of the table 1510. Here, the input terminating point of the first electronic device has a right edge direction, and an input starting point of the second electronic device does not have a left edge direction that is symmetrical to the right edge direction of the input terminating point of the first electronic device but has the top edge direction. If the input starting point and the input terminating point of two electronic devices are not symmetrical to each other as described above, the controller of the master device may determine that the display mode of the first screen 1210 is different from the display mode of the second screen 1220.

In addition, when the display modes of the two screens are different from each other, the controller of the master device may correct the user input information of the second row based on the transformation table 1310 of FIG. 12B so that the display mode of the second screen 1220 is the same as the display mode of the first screen 1210.

More specifically, the controller of the master device may perform a first search with respect to Col 1 of the transformation table 1310 shown in FIG. 12B, to thereby recognize a right edge direction of an input terminating point of a first electronic device including a first screen 1210. In addition, as a result of the first search, the controller of the master device may recognize that a right edge direction of an input terminating point of the first electronic device including the first screen 1210 is recorded in Row 4 of Col 1 in the transformation table 1310 shown in FIG. 12B.

Next, the controller of the master device may perform a second search to thereby recognize that the input starting point of a second electronic device including a second screen 1220 has a top edge direction in Row 4. In addition, as a result of the second search, the controller of the master device may recognize that a top edge direction of an input starting point of the second electronic device including the second screen 1220 is recorded in Col 3 of the above Row (see reference element 1312).

Finally, the controller of the master device may correct the input starting point and the input terminating point of the second electronic device including the second screen 1220 with reference to Col 1 and Col 3. That is, since a top edge direction of an input starting point of the second electronic device including the second screen 1220 is recorded in Row 1 of Col 1, and a left edge direction thereof is recorded in Row 1 of Col 3, the controller of the master device may correct the top edge direction of the input starting point of the second electronic device including the second screen 1220 into the left edge direction (1511). Likewise, since the bottom edge direction of the input terminating point of the second electronic device including the second screen 1220 is recorded in Row 2 of Col 1, and the right edge direction thereof is recorded in Row 2 of Col 3, the controller of the master device may correct the bottom edge direction of the input terminating point of the second electronic device including the second screen 1220 into the right edge direction (1511). With the above operations, the controller of the master device may determine the table 1510 of the user input information corrected as shown in FIG. 12C, and store the same in a memory (e.g., a storage unit 175).

According to various embodiments of the present disclosure, there is provided a method which enables a user to easily configure a multi-vision by using various kinds of electronic devices.

In addition, according to various embodiments of the present disclosure, there are provided a method and an electronic device which enable the user to easily configure a multi-vision having various structures by using one or more electronic devices of various sizes or forms.

It is noted that a method of configuring a multi-vision by an electronic apparatus according to an embodiment of the present disclosure may be implemented in a form of hardware, software, or a combination of hardware and software. Any such software may be stored, for example, in a volatile or non-volatile storage device such as a ROM, a memory such as a RAM, a memory chip, a memory device, or a memory IC, a recordable optical or magnetic medium such as a Compact Disk (CD), a Digital Versatile Disc (DVD), a magnetic disk, or a magnetic tape, regardless of its ability to be erased or its ability to be re-recorded, and a machine readable storage medium, e.g., a computer readable storage medium. It can be also appreciated that the memory included in the mobile terminal is one example of machine-readable devices suitable for storing a program including instructions that are executed by a processor device to thereby implement various embodiments of the present disclosure. Accordingly, the present disclosure includes a program for a code implementing the apparatus and method described in the appended claims of the specification and a machine (a computer or the like)-readable storage medium for storing the program. Moreover, such a program may be electronically transferred through a specific medium such as a communication signal transferred through a wired or wireless connection, and the present disclosure properly includes the equivalents thereof.

Further, the electronic device can receive the program from a program providing apparatus connected to the device wirelessly or through a wire and store the received program. The program providing device may include a program including instructions to instruct the electronic device to perform a method of configuring a multi-vision, a memory storing information required for the method of displaying a widget, a communication unit to perform wired or wireless communication with the electronic device, and a controller to transmit a corresponding program to the electronic device, automatically or in response to a request from the electronic device.

Various aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for configuring multi-vision by an electronic device, the method comprising:
    obtaining, by the electronic device, a user input;
    generating first user input information from the obtained user input;
    determining whether the electronic device is one of a master device and a slave device;
    when the electronic device is determined to be the master device, obtaining second user input information from one or more other electronic devices;
    determining whether display modes of the electronic device and the one or more other electronic devices are identical to each other based on the first user input information and the second user input information;
    correcting at least one of the first user input information and the second user input information in response to the display modes of the electronic device and the one or more other electronic device not being identical to each other; and
    determining an arrangement structure of one of the electronic device and the one or more other electronic devices based on one of the first user input information and the second user input information.

2. The method of claim 1, wherein one of the first user input information and the second user input information includes at least one of an input starting time of the user input, an input starting point of the user input, an input terminating time of the user input, and an input terminating point of the user input.

3. The method of claim 2, wherein one of the first user input information and the second user input information further includes resolution information of one of the electronic device and each of the one or more other electronic devices.

4. The method of claim 2, wherein the determining of whether the electronic device is one of the master device and the slave device further comprises:
    when the input starting point of the user input is in a non-edge area, determining that the electronic device is the master device; and
    when the input starting point of the user input is on an edge, determining that the electronic device is the slave device.

5. The method of claim 2, wherein the determining of whether the electronic device is one of the master device and the slave device further comprises:
    when the input terminating point of the user input is in a non-edge area, determining that the electronic device is the master device; and
    when the input terminating point of the user input is on an edge, determining that the electronic device is the slave device.

6. The method of claim 2, wherein the determining of whether the electronic device is one of the master device and the slave device further comprises:
    determining whether the electronic device is one of the master device and the slave device based on a current connection state of the electronic device.

7. The method of claim 2, wherein the determining of the arrangement structure of one of the electronic device and the one or more other electronic devices further comprises:
    arranging the user input according to one of the first user input information and the user input according to the second user input information, based on one of the input starting time and the input terminating time.

8. The method of claim 7, wherein the determining of the arrangement structure of one of the electronic device and the one or more other electronic devices further comprises:
    searching for one of the first user input information and the second user input information in sequence according to an arrangement sequence of user inputs; and
    determining a location of one of the electronic device and each of the one or more other electronic devices based on one of the input starting point and the input terminating point of one of the first user input information and the second user input information.

9. The method of claim 8, wherein the determining of the arrangement structure of one of the electronic device and the one or more other electronic devices further comprises:

correcting one of the input starting point and the input terminating point of one of the first user input information and the second user input information before the determining of the location of one of the electronic device and each of the one or more other electronic devices.

10. The method of claim 2, further comprising:
when the electronic device is determined to be the slave device, transmitting the first user input information to one of the other electronic devices.

11. A non-transitory computer-readable storage medium storing instructions that, when executed, cause at least one processor to perform the method of claim 1.

12. An electronic device for configuring multi-vision, the electronic device comprising:
a screen configured to obtain a user input;
a communication interface configured to communicate with one or more other electronic devices; and
a controller configured to:
generate first user input information based on the user input obtained through the screen;
determine whether the electronic device is one of a master device and a slave device;
control the communication interface to obtain second user input information from the one or more other electronic devices when the electronic device is determined to be the master device;
determine whether display modes of the electronic device and the one or more other electronic devices are identical to each other based on the first user input information and the second user input information;
correct at least one of the first user input information and the second user input information in response to the display modes of the electronic device and the one or more other electronic device not being identical to each other; and
determine an arrangement structure of one of the electronic device and the one or more other electronic devices based on one of the first user input information and the second user input information.

13. The electronic device of claim 12, wherein one of the first user input information and the second user input information includes at least one of an input starting time of the user input, an input starting point of the user input, an input terminating time of the user input, and an input terminating point of the user input.

14. The electronic device of claim 13, wherein one of the first user input information and the second user input information further includes resolution information of one of the electronic device and each of the one or more other electronic devices.

15. The electronic device of claim 13, wherein,
when the input starting point of the user input is in a non-edge area, the controller is further configured to determine that the electronic device is the master device, and when the input starting point of the user input is on an edge, the controller is further configured to determine that the electronic device is the slave device.

16. The electronic device of claim 13, wherein,
when the input terminating point of the user input is in a non-edge area, the controller is further configured to determine that the electronic device is the master device, and when the input terminating point of the user input is on an edge, the controller is further configured to determine that the electronic device is the slave device.

17. The electronic device of claim 13, wherein the controller is further configured to determine whether the electronic device is one of the master device and the slave device based on a current connection state of the electronic device.

18. The electronic device of claim 13, wherein the controller is further configured to arrange the user input according to one of the first user input information and the user input according to the second user input information, based on one of the input starting time and the input terminating time.

19. The electronic device of claim 18, wherein the controller is further configured to search for one of the first user input information and the second user input information in sequence according to an arrangement sequence of user inputs, and to determine a location of one of the electronic device and each of the one or more other electronic devices based on one of the input starting point and the input terminating point of one of the first user input information and the second user input information.

20. The electronic device of claim 19, wherein the controller is further configured to correct one of the input starting point and the input terminating point of one of the first user input information and the second user input information before determining the location of one of the electronic device and each of the one or more other electronic devices.

21. The electronic device of claim 12, wherein,
when the electronic device is determined to be the slave device, the controller is further configured to control the communication interface to transmit the first user input information to one of the other electronic devices.

* * * * *